(12) United States Patent
Zamer

(10) Patent No.: US 9,875,496 B2
(45) Date of Patent: Jan. 23, 2018

(54) PRODUCT SCHEMATICS COLLECTION AND PROJECTION

(71) Applicant: eBay Inc., San Jose, CA (US)

(72) Inventor: Kamal Zamer, Austin, TX (US)

(73) Assignee: eBay Inc., San Jose, CA (US)

( * ) Notice: Subject to any disclaimer, the term of this patent is extended or adjusted under 35 U.S.C. 154(b) by 746 days.

(21) Appl. No.: 14/066,531

(22) Filed: Oct. 29, 2013

(65) Prior Publication Data

US 2015/0120503 A1 Apr. 30, 2015

(51) Int. Cl.
*H04N 9/31* (2006.01)
*G06Q 30/06* (2012.01)
*G06F 3/14* (2006.01)
*G09G 3/00* (2006.01)

(52) U.S. Cl.
CPC ....... *G06Q 30/0623* (2013.01); *H04N 9/3185* (2013.01); *H04N 9/3194* (2013.01); *G06F 3/14* (2013.01); *G09G 3/002* (2013.01); *G09G 2340/04* (2013.01); *G09G 2340/14* (2013.01)

(58) Field of Classification Search
None
See application file for complete search history.

(56) References Cited

U.S. PATENT DOCUMENTS

| | | | |
|---|---|---|---|
| 6,016,147 A * | 1/2000 | Gantt | G06F 17/50 345/419 |
| 7,843,449 B2 | 11/2010 | Krah | |
| 8,018,579 B1 | 9/2011 | Krah | |
| 8,693,056 B2 * | 4/2014 | Abeloe | H04N 1/40 358/1.9 |
| 2010/0073326 A1 * | 3/2010 | Keam | G06F 3/0425 345/175 |
| 2010/0093399 A1 * | 4/2010 | Kim | H04M 1/0202 455/566 |
| 2011/0221781 A1 * | 9/2011 | Okamoto | G01B 11/026 345/660 |
| 2013/0110666 A1 * | 5/2013 | Aubrey | G06Q 30/0641 705/26.5 |
| 2014/0306939 A1 * | 10/2014 | Tamura | G06F 3/0418 345/178 |

OTHER PUBLICATIONS

Johnny C. Lee, Paul H. Dietz, Dan Maynes-Aminzade, Ramesh Raskar, and Scott E. Hudson. 2004. Automatic projector calibration with embedded light sensors. In Proceedings of the 17th annual ACM symposium on User interface software and technology (UIST '04). ACM, New York, NY, USA, 123-126. DOI=http://dx.doi.org/10.1.*

(Continued)

*Primary Examiner* — Maria Teresa O Thein
*Assistant Examiner* — Michelle T Kringen
(74) *Attorney, Agent, or Firm* — Shook, Hardy & Bacon L.L.P.

(57) ABSTRACT

A method of projecting a likeness of an item onto a surface is disclosed. A determination that a user is interested in an item is made. A schematic corresponding to the item is identified based on information about the item. The user is provided with an option to project a likeness of the item onto a surface. Based on an accepting of the option by the user, a device of the user is instructed to project the likeness of the item onto the surface based on the schematic.

17 Claims, 7 Drawing Sheets

(56) References Cited

OTHER PUBLICATIONS

"3D Projection", Wikipedia, [Online], Retrieved from the Internet: <URL: http://en.wikipedia.org/wiki/3D_projection>, (Accessed Jul. 1, 2013), 3 pgs.

"Handheld projector", Wikipedia, [Online]. Retrieved from the Internet; <URL: http://en.wikipedia.org/wiki/Handheld_projector>, (Accessed Jul. 1, 2013), 6 pgs.

"Holography", Wikiepedia, [Online]. Retrieved from the Internet: <URL: http://en.wikipedia.org/wiki/Holography>, (Accessed Jul. 1, 2013), 26 pgs.

"Whoa—Apple Wins a 3D Display & Imaging System Patent Stunner", [Online], Retrieved from the Internet: <URL: http://www.patentlyapple.com/patently-apple/2011/09/whoa-apple-wins-a-3d-display-imaging-system-patent-stunner.html>, (Sep. 13, 2011), 13 pgs.

"Why Apple Will Turn to Holograms", Businessweek, [Online]. Retrieved from the Internet: <URL: http://www.businessweek.com/articles/2012-08-07/why-apple-will-turn-to-holograms>, (Aug. 7, 2012), 19 pgs.

* cited by examiner

PRODUCT SCHEMATICS COLLECTION AND PROJECTION

TECHNICAL FIELD

The present application relates generally to the technical field of internet commerce, and, in one specific example, to a system and method that provides for collection and projection of product schematics.

BACKGROUND

Various network-based publication systems (e.g., EBAY®, AMAZON®, or CRAIGSLIST®) may facilitate buying or selling of items (e.g., goods or services) by their users. However, in various circumstances, a buyer who has not measured size dimensions of an item that the buyer seeks to purchase may not be able to determine whether the item will fit in a particular space or how the item will look once it is there. Therefore, the buyer may only discover after the buyer receives the item that the item does not have an acceptable attribute, such as size, shape, or appearance. In this case, the buyer may return the item to the seller. Such item returns may result in a loss of efficiency or loss of revenues for buyers, sellers, or an entity operating the network-based publication system.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

Consistent with various embodiments, methods and systems for projecting a likeness of an item onto a surface is disclosed. A determination is made that a user is interested in an item. A schematic corresponding to the item is identified based on information about the item. The user is provided with an option to project a likeness of the item onto a surface. Based on the accepting of the option by the user, a device of the user is instructed to project the likeness of the item onto the surface according to the schematic.

This method and various embodiments disclosed herein may be implemented as a computer system having one or more modules (e.g., hardware modules or software modules). This method and various embodiments disclosed herein may be embodied as instructions stored on a machine-readable medium that, when executed by a processor, cause the processor to perform the method.

Figure 1:
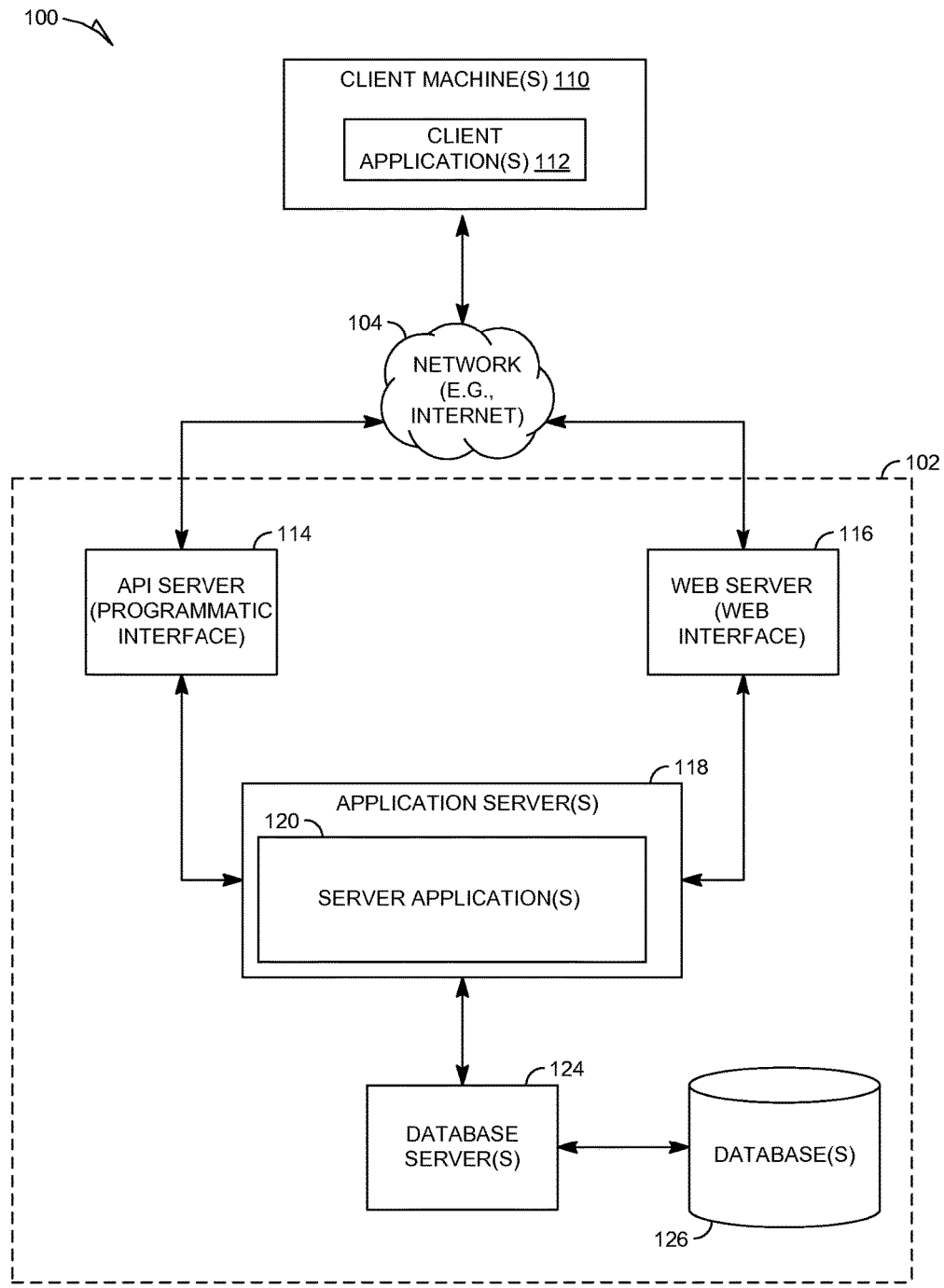
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors (e.g., Visa, MasterCard, and American Express).

Web applications executing on the client machine(s) 110 may access the various applications 120 via the web interface supported by the web server 116. Similarly, native applications executing on the client machine(s) 110 may access the various services and functions provided by the applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
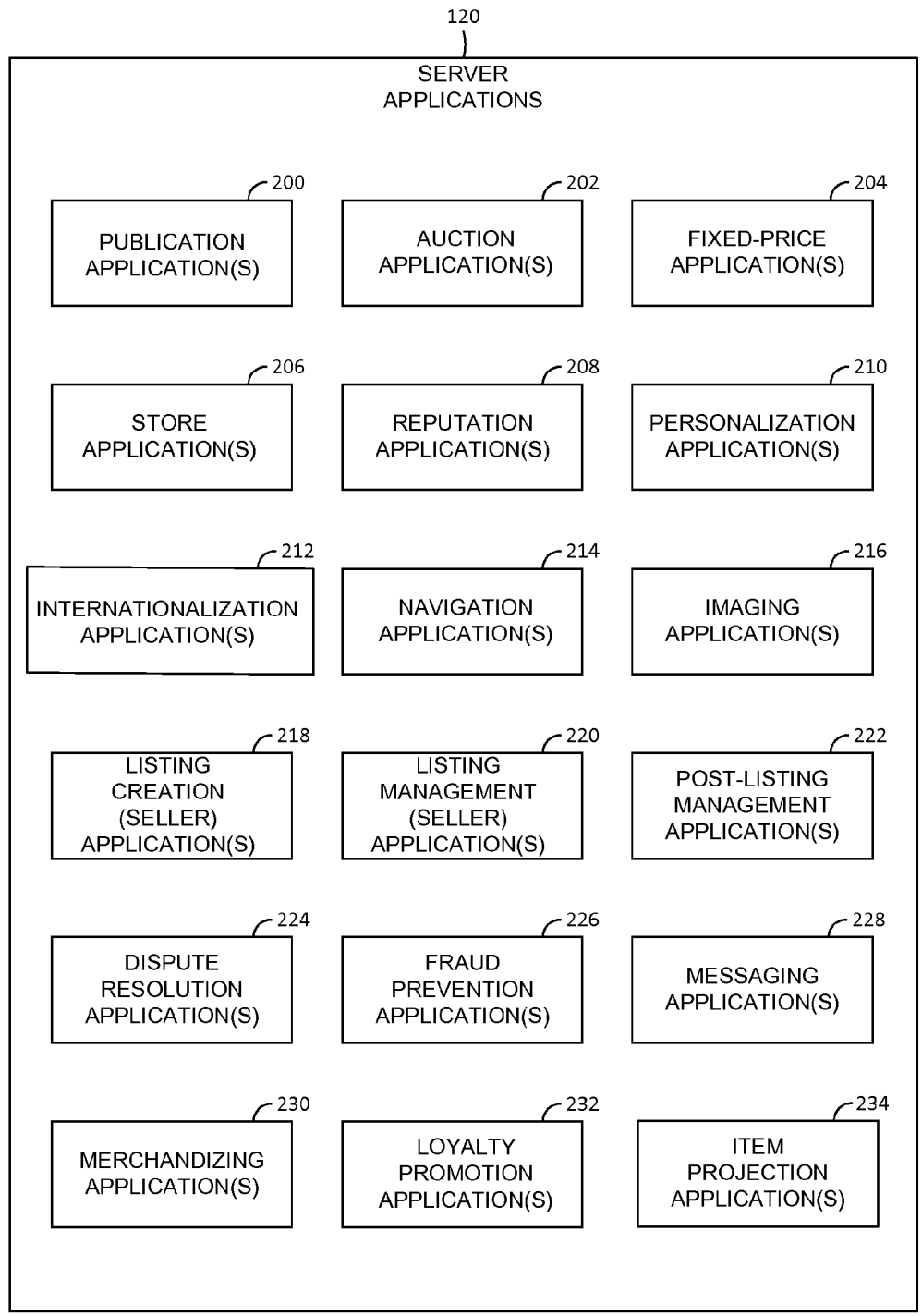
FIG. 2 is a block diagram illustrating multiple applications including best offer applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Item projection application(s) 234, described in more detail below, may facilitate the projecting of a visual representation of an item onto a surface. Based on the projection, a user may be able to determine how the item would look if placed on the surface.

Figure 3A:
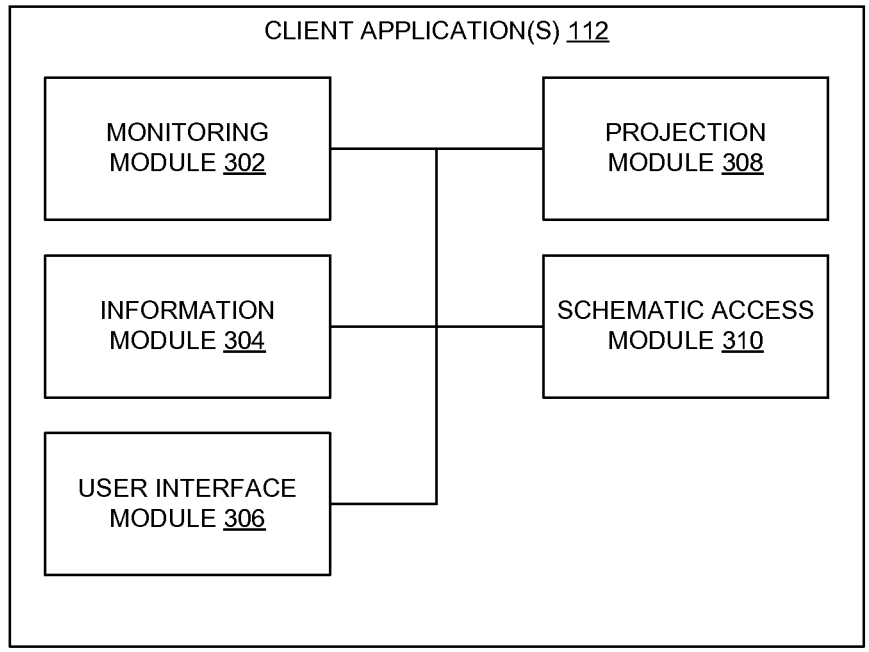
FIG. 3A is a block diagram illustrating example modules of the client application(s) of FIG. 1.

FIG. 3A is a block diagram illustrating example modules of the client application(s) 112. A monitoring module 302 may be configured to monitor online activities of a user with respect to items that may be listed on a network-based publication system. An information module 304 may be configured to collect information from which the item may be identified, such as an image of the item, a barcode corresponding to the item, a product identifier corresponding to the item, and so on. A user interface module 306 may be configured to present a user interface to the user for collecting information about the item, providing the user with an option to access schematics pertaining to the item, providing the user with the option to project a likeness of the item onto a surface, or providing the user with the ability to calibrate the projection of the item. A schematic access module 310 may access schematics corresponding to an item. For example, the schematic access module 310 may access schematics from storage on the device or the schematic access module 310 may download the schematics (e.g., based on communication with a schematic collection module 354) as is described in more detail below. In various embodiments, schematics may be downloaded, stored, and organized on the client device (e.g., via the schematic access module 310 or schematic collection module 354) and then accessed independently of the item projection application(s) 234 at a later date.

In various embodiments, various functions of the client application(s) 112 may be provided by the item projection application(s) 234 of the server application(s) 120 instead of, in addition to, or in combination with the client application(s) 112. For example, item-projection functions may be distributed between the client and server applications.

Figure 3B:
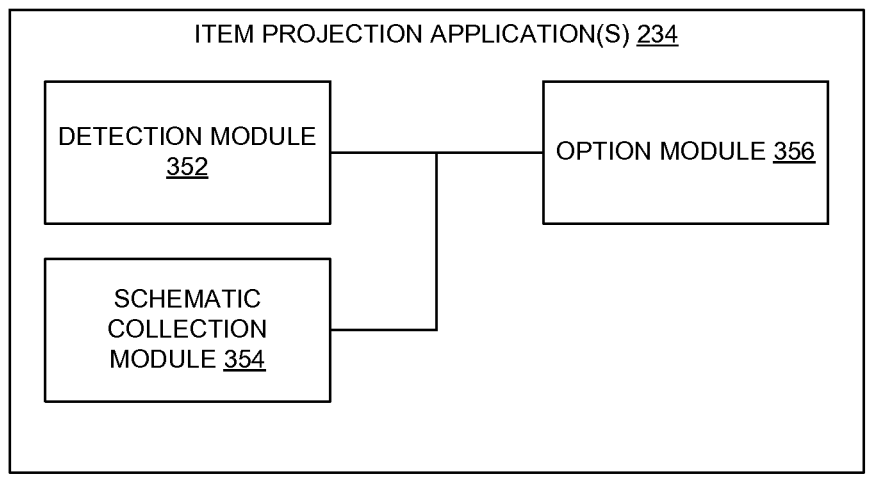
FIG. 3B is a block diagram illustrating example modules of the item projection application(s) of FIG. 2.

FIG. 3B is a block diagram illustrating example modules of the item projection application(s) 234. A detection module 352 may be configured to detect that a user is interested in an item. For example, the detection module 352 may determine that a user has performed actions on a client device with respect to an item (e.g., based on a communication received from the monitoring module 302). Alternatively, the detection module 352 may determine that a user has performed actions with respect to the network-based publication system that pertain to the item. For example, the detection module 352 may detect that a user has browsed the item, made a posting pertaining to the item, watched listings of the item, placed a bid on the item, and so on.

The schematic collection module 354 may be configured to collect schematics corresponding to items that may be listed on the network-based publication system. For example, the schematic collection module 354 may receive schematics from buyers or sellers of the items or through crowd sourcing.

An option module 356 may be configured to provide a user who browses a listing of an item with an option to project a likeness of the item onto a surface. This option may be presented to the user via a user interface element (e.g., a "Project" button) that is provided in a listing page corresponding to the item. Alternatively, this option may be presented to the user interface via a user interface presented to the user via the user interface module 306.

Figure 4:
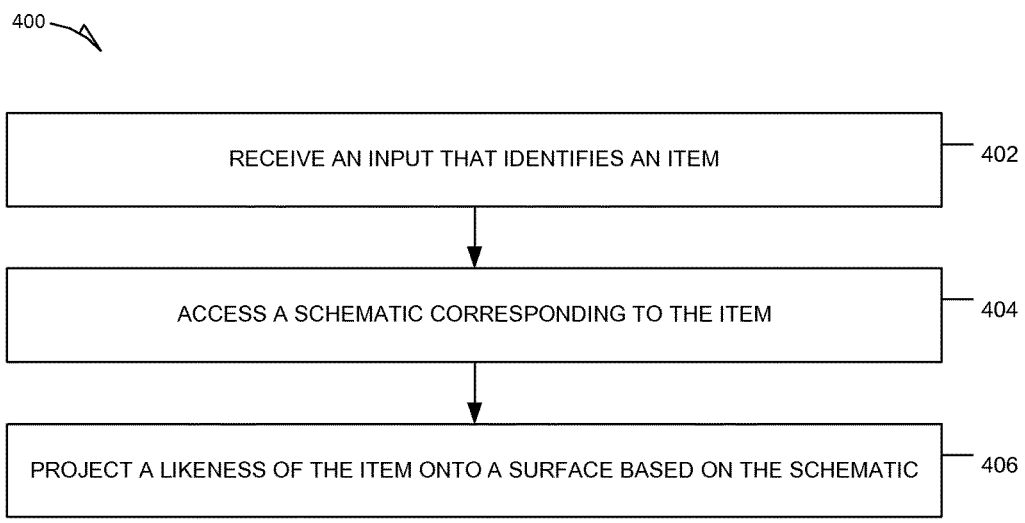
FIG. 4 is a sequence diagram illustrating an example sequence of steps of projecting a likeness of an item onto a surface based on a schematic corresponding to the item.

FIG. 4 is a sequence diagram illustrating an example sequence 400 of operations for projecting a likeness of an item onto a surface based on a schematic corresponding to the item. In various embodiments, various operations of the sequence 400 may be performed by various modules of the client application(s) 112 or the item projection application(s) 234.

At operation 402, the monitoring module 302 may receive an input that identifies an item that may be listed on a network-based publication system. For example, the monitoring module 402 receives an image of the item, a content item (e.g., a news article or an internet posting) pertaining to the item, a product identifier of the item, a bar code corresponding to the item, a search result containing the item, and so on.

At operation 404, the schematic access module 310 may access a schematic corresponding to the item. For example, the schematic access module 310 may provide input identifying the item to the schematic collection module 324. Based on the input, the schematic collection module 324 may identify a previously-collected schematic corresponding to the item. The schematic collection module 324 may then provide the schematic to the schematic access module 310. In various embodiments, the schematic access module 310 may store the schematic on the device for later access. Thus, the access module 310 may allow the user to collect schematics corresponding to one or more items. Additionally, the schematic access module 310 may allow a user of the device to view stored schematics and access them independently of any communication with the networked system 102.

At operation 406, the projection module 308 may project a likeness of the item onto a surface based on the schematic. For example, the projection module may depict attributes of the product, such as the size or shape of the product (e.g., as a wireframe) such that the user may determine how the actual item would look if placed on the surface. For example, the user may determine whether a painting fits on a particular location on a wall. Alternatively, the user may determine whether a particular piece of furniture fits at a particular location on the floor. Further still, the user may determine whether a particular laptop computer fits in a carrying case. In another example, the user may be able to determine whether a particular container will be able to store a particular object.

In various embodiments, the projection module 308 may project the likeness of the item onto the surface in three dimensions (e.g., as a holographic or other three-dimensional image). In various embodiments, the projection module 308 may project other attributes of the item, such as color or shape, onto the surface. For example, a user may use a projection to determine how a color of a particular item matches fits, or blends with the color of other items with which it may be placed.

Figure 5:
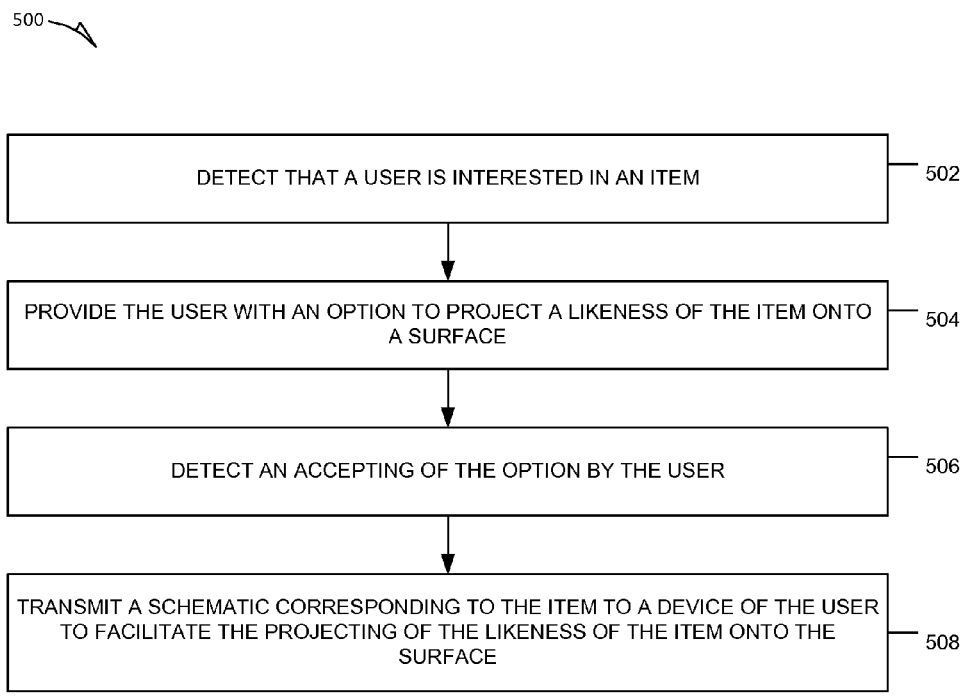
FIG. 5 is a sequence diagram illustrating an example sequence of steps of projecting a likeness of an item onto a surface based on a schematic corresponding to the item.

FIG. 5 is a sequence diagram illustrating an example sequence 500 of operations for projecting a likeness of an item onto a surface based on a schematic corresponding to the item. In various embodiments, various operations of the sequence 500 may be performed by various modules of the client application(s) 112 or the item projection application(s) 234.

At operation 502, the detection module 352 may detect that a user is interested in an item. For example, the detection module 352 may determine that a user has viewed a listing page corresponding to the item (e.g., a listing page that has been created on the network-based publication system by a seller of the item). Alternatively, the detection module 352 may determine that a user is watching a listing of the item. In other embodiment, the detection module 352 may determine that a user has posted content (e.g., a news article, blog posting, or status update) pertaining to the item. Further still, the detection module 352 may determine that the user has expressed a liking for a post by another user of content pertaining to the item. In a further embodiment, the detection module 352 may determine that a user has viewed content pertaining to the item. Additionally, the detection module 352 may determine that the user has authored content or responded to a communication of content (e.g., an email message, instant message, and so on) pertaining to the item.

In various embodiments, the detection module 352 may determine the interest of the user in the item based on monitoring behavior of the user with respect to the network-based publication system. In various embodiments, the detection module 352 may determine the interest of the user based on interactions of the user with the client machine(s) 110 or the client application(s) 112 (e.g., based on communications received from the monitoring module 302).

At operation 504, the option module 356 provides the user with an option to project a likeness of the item onto a surface. For example, the option module 356 may generate a button (e.g., a "Project Item") for inclusion on a listing page corresponding to the item. Alternatively, the option module 356 may send a communication to the user interface module 306 that instructs the user interface module 306 to present a user interface element to the user that allows the user to activate a projection feature of the device (e.g., via the projection module 308).

At operation 506, the option module 356 detects accepting of the option by the user. For example, the option module 356 detects that a user has clicked on the Project Item button or that the user has activated the user interface element.

At operation 508, the schematic collection module 354 may transmit a schematic corresponding to the item to a device of the user (e.g., client machine 110). The schematic may include information pertaining to one or more attributes of the item, such as size, shape, dimensions, or color. Thus, the user may be able to inspect an attribute of the item without having physical possession of the item, aiding the user in determining whether to purchase the item. The schematic may be collected by the schematic collection module 354 (e.g., from a manufacturer of the item or a user of the network-based publication system). The schematic may be received by the schematic access module 310 and analyzed and projected onto a surface by the projection module 308.

Figure 6:
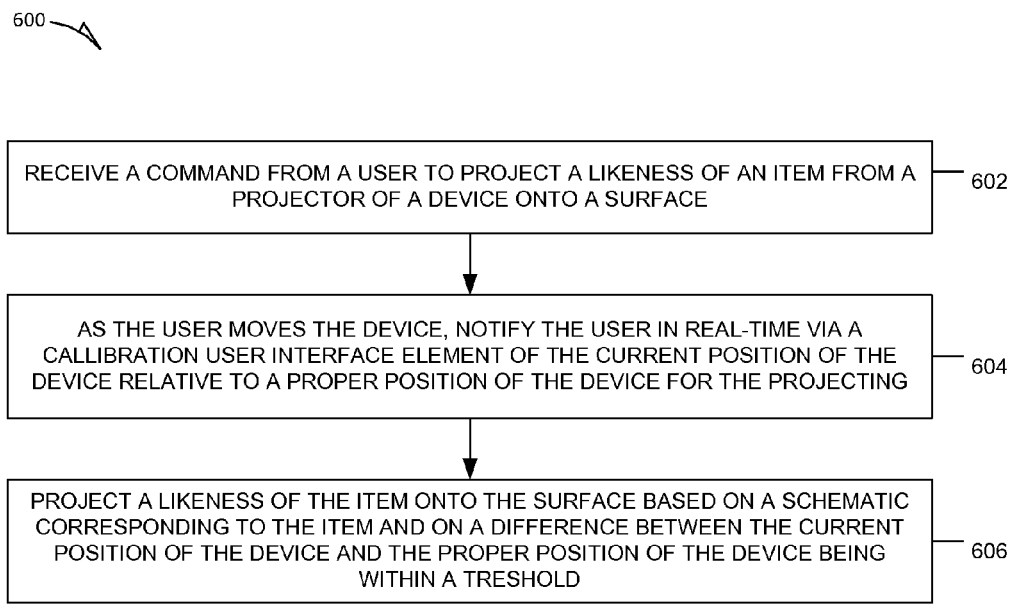
FIG. 6 is a sequence diagram illustrating an example sequence of steps of projecting a likeness of an item onto a surface based on a schematic corresponding to the item.

FIG. 6 is a sequence diagram illustrating an example sequence 600 of operations for projecting a likeness of an item onto a surface based on a schematic corresponding to the item. In various embodiments, various operations of the sequence 600 may be performed by various modules of the client application(s) 112 or the item projection application(s) 234.

At operation 602, the user interface module 306 may receive a command from a user to project a likeness of an item from a projector of the device onto a surface. For example, the user interface module 306 may detect that a user has clicked on a Project Item button associated with the item within a native application executing on the device or on a listing page accessed by the user via a web browser executing on the device.

At operation 604, the user interface module 604 may notify the user in real-time (e.g., as the user moves the device back and forth toward a surface onto which the user wishes to project the likeness of the item or otherwise orients the device with respect to the surface), via a calibration user interface element, of the position of the device relative to a proper position of the device for projecting the likeness of the item. For example, the user interface module 604 may notify the user in real-time as the user moves the device that the device is to be moved closer to or farther from the surface or that the device is to be oriented in a different manner with respect to the surface. In various embodiments, the user interface module 604 determines the distance of the device from the surface or the orientation of the device with respect to the surface based on data received from sensors of the device, such as a video camera, gyroscope, compass, proximity sensor, motion sensor, and so on.

At operation 606, the projection module 308 projects a likeness of the item onto the surface. In various embodiments, the projecting of the likeness of the item onto the surface is based on a schematic of the item that is stored on the device or received from the schematic collection module 354. In various embodiments, the projecting of the likeness of the item onto the surface is based on a difference between the current position of the device and the proper position of the device being within a threshold. For example, the projecting may be based on the device being oriented and positioned with respect to the surface in a proper position to enable the projecting of the likeness of the item to properly reflect that actual attributes of the item that are captured in the likeness within certain tolerances. For example, if a proper projection onto the surface requires the device to be oriented at 0 degrees on the compass, parallel to the surface, and 5 feet from the surface, the projecting may be considered to be calibrated if the device is oriented at between 355 degrees and 5 degrees (e.g., a 10-degree tolerance), within two degrees of being parallel to the surface, and within 4.75 and 5.25 feet from the surface.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 7:
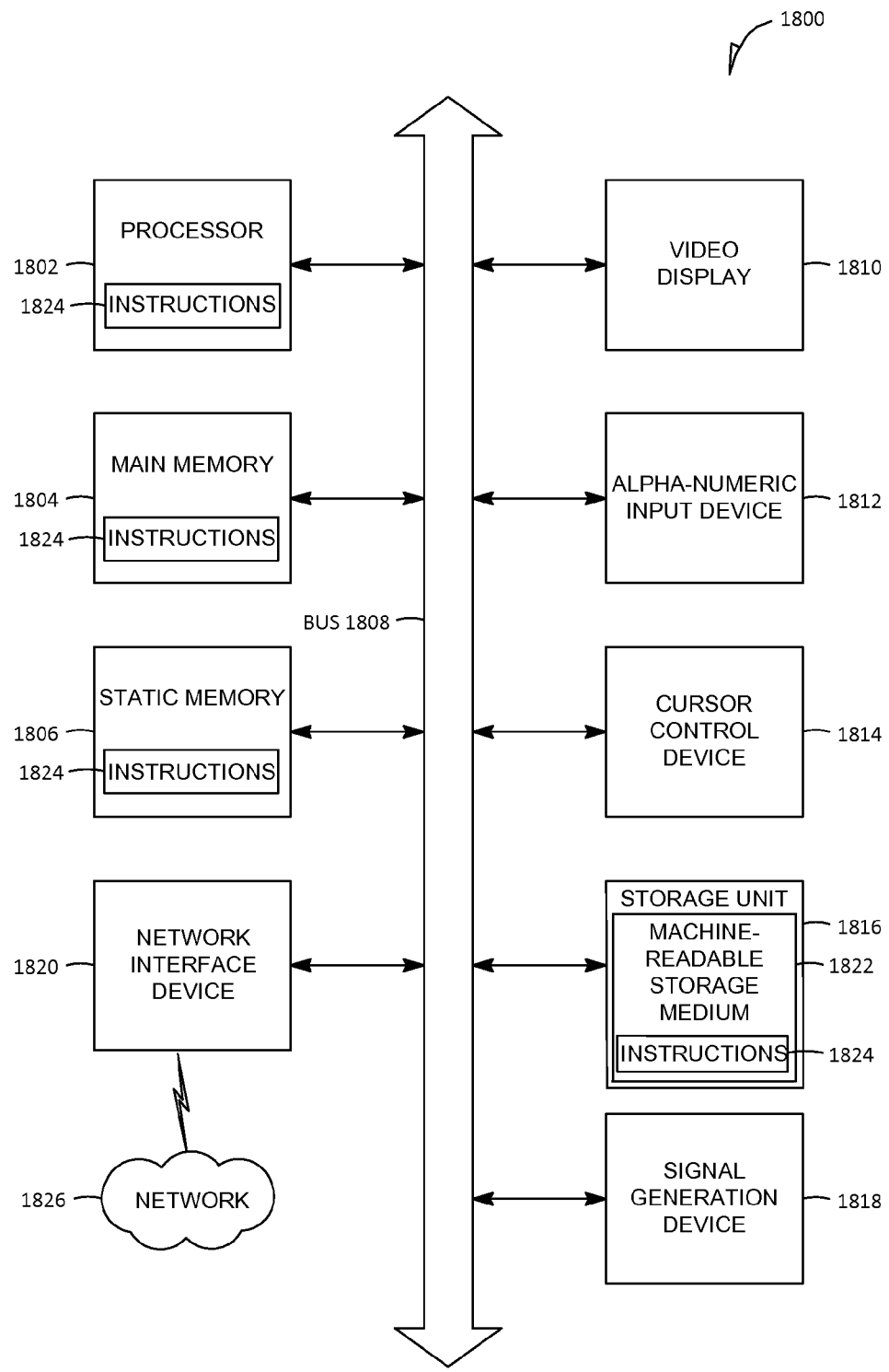
FIG. 7 is a block diagram of machine in the example form of a computer system within which instructions for causing the machine to perform any one or more of the methodologies discussed herein may be executed.

FIG. 7 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
   incorporating one or more modules into a device for enhancing a projection capability of the device with projection logic for presenting a user interface for allowing a user to control a projection of a wireframe depiction of attributes of an item onto a surface and ensuring that the wireframe depiction accurately reflects attributes of the item within predefined tolerances, the one or more modules configuring one or more processors of the device to perform operations including:
   providing the user with an option, via the user interface, to project the wireframe depiction of the attributes of the item onto the surface;
   based on accepting of the option by the user:
   identifying a schematic corresponding to the item based on information about the item stored in a database of a network-based publication system, the schematic specifying information about the attributes of the item, the attributes including a size of the item and a shape of the item;
   providing the user with an ability, via the user interface, to calibrate the projection capability of the device, the providing of the user with the ability including notifying the user via the user interface in real time as the user moves and orients the device with respect to the surface whether the device is oriented within a number of degrees parallel to the surface and within a distance to the surface, the number of degrees and the distance selected such that the wireframe depiction of the attributes of the item accurately represents the attributes of the item within the predefined tolerances;
   instructing the device to project the wireframe depiction of the item onto the surface based on the schematic, the projection logic being implemented by the one or more processors of the device.

2. The method of claim 1, wherein the attributes of the item include colors of the item.

3. The method of claim 1, further comprising receiving the schematic from an additional user of the network-based publication system.

4. The method of claim 1, further comprising determining that the user is interested in the item based on a monitoring of a behavior of the user with respect to the network-based publication system.

5. The method of claim 1, further comprising determining that the user is interested in the item based on a monitoring of a behavior of the user with respect to the device of the user.

6. The method of claim 1, wherein the schematic is stored on the device as one of a collection of schematics available for later access by the user, the projecting of the schematic being independent of a communication with the network-based publication system from which the schematic was downloaded onto the device.

7. A system comprising:
   one or more computer processors;
   one or more memories including an enhancement to projection capability of a device, the enhancement including projection logic for presenting a user interface for allowing a user to control a projection of a wireframe depiction of attributes of an item onto a surface and ensuring that the wireframe depiction accurately reflects the attributes of the item within predefined tolerances, the projection logic configuring the one or more computer processors to, at least:
   provide the user with an option, via the user interface, to project the wireframe depiction of the attributes of the item onto the surface;
   based on accepting of the option by the user:
   identify a schematic corresponding to the item based on information about the item stored in a database of a network-based publication system, the schematic specifying information about the attributes of the item, the attributes including a size of the item and a shape of the item;
   provide the user with an ability, via the user interface, to calibrate the projection capability of the device, the providing of the user with the ability including notifying the user via the user interface in real time as the user moves and orients the device with respect to the surface whether the device oriented within a number of degrees parallel to the surface and within a distance to the surface, the number of degrees and the distance selected such that the wireframe depiction accurately represents the attributes of the item within the predefined tolerances;
   instruct the device to project the wireframe depiction of the attributes of the item onto the surface based on the schematic, the projection logic being implemented by the one or more processors of the device.

8. The system of claim 7, wherein the attributes of the item include colors of the item.

9. The system of claim 7, the projection logic further configuring the one or more computer processors to receive the schematic from an additional user of the network-based publication system.

10. The system of claim 7, the projection logic further configuring the one or more computer processors to determine that the user is interested in the item based on a monitoring of a behavior of the user with respect to the network-based publication system.

11. The system of claim 7, the projection logic further configuring the one or more computer processors to determine that the user is interested in the item based on a monitoring of a behavior of the user with respect to the device of the user.

12. The system of claim 7, the projection logic further configuring the one or more computer processors to project the wireframe depiction of the item onto the surface based on a calibration of the device for the projecting falling within predetermined tolerances.

13. A non-transitory machine readable medium embodying a set of instructions that, when executed by one or more processors, causes the one or more processors to perform operations to enhance to a projection capability of a device, the instructions including projection logic for presenting a user interface for allowing a user to control a projection of a wireframe depiction of attributes of an item onto a surface and ensuring that the wireframe depiction accurately reflects the attributes of the item within predefined tolerances, the operations comprising:

enhancing the projection capability of the device with projection logic for presenting the user interface for allowing the user to control the projection of the wireframe depiction of the item onto the surface and ensuring that the wireframe depiction accurately reflects the attributes of the item within the predefined tolerances, the enhancing including:

providing the user with an option, via the user interface, to project the wireframe depiction of the attributes of the item onto the surface;

based on accepting of the option by the user:

identifying a schematic corresponding to the item based on information about the item stored in a database of a network-based publication system, the schematic specifying the attributes of the item, the attributes including a size of the item and a shape of the item;

providing the user with an ability, via the user interface, to calibrate the projection capability of the device, the providing of the user with the ability including notifying the user via the user interface in real time as the user moves and orients the device with respect to the surface whether the device is oriented within a number of degrees parallel to the surface and is within a distance to the surface, the number of degrees and the distance selected such that the wireframe depiction accurately represents the attributes of the item within the predefined tolerances;

instructing the device to project the wireframe depiction of the item onto the surface based on the schematic.

14. The non-transitory machine readable medium of claim 13, wherein the attributes of the item include colors of the item.

15. The non-transitory machine readable medium of claim 13, the operations further comprising receiving the schematic from an additional user of the network-based publication system.

16. The non-transitory machine readable medium of claim 13, the operations further comprising determining that the user is interested in the item based on a monitoring of a behavior of the user with respect to the network-based publication system.

17. The non-transitory machine readable medium of claim 13, the operations further comprising determining that the user is interested in the item based on a monitoring of a behavior of the user with respect to the device of the user.

* * * * *